Patented June 26, 1951

2,558,092

UNITED STATES PATENT OFFICE 2,558,092

FEED FOR CARNIVOROUS ANIMALS AND METHOD OF MAKING THE SAME

William H. Kelly, Jr., Medina, and John R. Kelly, Sharon Center, Ohio

No Drawing. Application January 11, 1949, Serial No. 70,374

7 Claims. (Cl. 99—2)

This invention relates to a feed for carnivorous animals, particularly dogs, foxes, and the like, and to a method of making the same.

Heretofore feeds of this character have been made essentially of meat and cereal, a small proportion of miscellaneous fortifying chemicals, vitamins, and other food ingredients being added. Such prior feeds are marketed as dry feeds or frozen feeds. In the case of the dry feeds, the granulated ingredients are first dehydrated and then mixed thoroughly and packaged. Water to give the desired consistency is added when the feed is to be used.

In the case of the frozen feeds, dehydrated meat and cereal are ground, the fortifying ingredients added, water added to the amount of about seventy-six percent, by weight, and the entire mass thoroughly mixed and frozen into relatively large blocks. If fresh meat is used instead of dehydrated meat, only about forty percent, by weight, of water is added as fresh meat contains about thirty-six percent (36%) moisture in the form of natural fluids.

In use these prior feeds have several objectionable features.

As to dry feeds, animals apparently soon tire of them and avoid them except in so far as there is no other food readily available. If, after the water has been added, all of the mixture is not eaten, it soon becomes a doughy and unpalatable mass which attracts flies, adheres to the feeding receptacles tenaciously and, because of souring of the cereal occasioned by the water, produces an offensive odor and becomes unsuitable for use.

As to the prior frozen foods, the blocks usually contain a much larger amount of food than is required for a single feeding. To break such blocks apart while they are frozen is very difficult. Accordingly, they must be partially thawed to permit removal of a surface layer after which they are rechilled or refrozen, or they must be almost completely thawed, after which a chunk of suitable size is separated and removed and the remainder rechilled or refrozen. Thus the feed is subject to repeated chilling or freezing and warming or thawing. When thawed, germs and micro-organisms enter the mass and attack it, and, due to the presence of the water, the cereal sours quickly under the influence of various organisms and molds. Once the block has been thawed, rechilling does not prevent the souring of the cereal, or the action of the germs and micro-organisms and the feed continues to deteriorate, though at a slower rate. Furthermore, after once being thawed, the feed becomes a soggy and unpalatable mass which often is entirely unsatisfactory for feeding. Due to the size of the blocks, so much time is required for warmth to penetrate it to an appreciable depth that the outer strata deteriorate before the inner strata have thawed sufficiently for cutting. In addition, the time required and repeated handling is a source of annoyance and inconvenience to the feeder.

One of the principal objects of the present invention is to provide a feed in which the above objectionable features are eliminated.

More specific objects are to provide a feed in which the ingredients retain their original qualities for a much longer period.

Another specific object is to arrange the feed in such form that it can be deep frozen more quickly and such that any portion thereof desired for feeding can be removed readily while the remainder remains frozen or at a temperature sufficiently low for preservation of the original qualities, and such that, even after warming or thawing, it can be chilled in the usual domestic refrigerator quickly enough to prevent deterioration.

An equally important and specific object is to provide a feed consisting essentially of fresh meat and cereal in which substantially all of the moisture content is derived from the natural fluids of the meat as a result of which the objectionable souring of the cereal under normal conditions of use is eliminated.

Other objects and advantages will become apparent from the following description in which a preferred embodiment of our invention is disclosed for purposes of illustration, it being apparent that the invention is not to be limited to the preferred example.

A preferred feed in accordance with the present invention comprises individually compact, frangible, moist pellets of which the ingredients are essentially dried cereal particles and fresh meat particles in about equal proportions. A small percentage of fortifying ingredients may be included if desired though such are not necessary.

For example, a suitable mix which includes fortifying ingredients, may be as follows, by weight,

| | Per cent |
|---|---|
| Ground fresh meat | About 48 |
| Precooked dry cereal | About 48 |
| Fortifying ingredients | Balance |

If, in the foregoing example, no fortifying ingredients are to be included the mix will be simply equal amounts of meat and cereal.

Another example may be as follows, by weight,

| | Per cent |
|---|---|
| Ground fresh meat | 40 to 50 |
| Dried cereal | 40 to 50 |
| Fortifying ingredients | Balance |

Again, variation may be made in the meat-cereal ratio, depending on the amount of natural fluids in the meat. Thus, by weight, the mix may be as follows:

| | Per cent |
|---|---|
| Ground fresh meat | 45 to 55 |
| Dried cereal | 55 to 45 |

The fresh meat preferably includes a substantial or high proportion of animal organs, such as stomach, intestines, hearts, and the like. Meat from one or more animals may be used but beef is preferred.

The cereal may be any one or more of those commonly used for human and animal foods. A cereal mixture found particularly desirable is one which is available on the market under the name "Kellog's Hexite Cereal" and which is precooked and dried in small flakes. It is composed of corn and wheat germ meals, flakes of wheat, rice and corn, wheat bran, dried brewer's yeast, soy bean oil meal, rice bran, and wheat germ oil, the foregoing mix being fortified with a small percentage of dried skim milk, dried whey, salt, calcium carbonate, ground limestone, potassium iodide, iron oxide and steamed bonemeal. The precooked cereal is preferred to raw cereal as it appears that many of the nutrient values thereof can be utilized by carnivorous animals which cannot be utilized efficiently in the case of raw cereals.

Additional fortifying ingredients to provide certain vitamin content and the like include tomato pulp, dehydrated alfalfa meal, vitamin A and D feeding oils, yeast culture, defluorinated (colloidal) rock phosphate, calcium sulphate, and irradiated yeast.

In preparing the feed, the fresh meat is coarse ground and about an equal amount, by weight, of dry flake cereal is added. These ingredients are then stirred and mixed together until the free fluids or juices of the meat are absorbed by the cereal. This usually requires about seven minutes, though less time is required if the moisture content is somewhat high. No water is added. This forms a loose mass too dry for molding by hand pressure. The proper consistency of the mix can be determined by pulling up a handful from the mass. If it is too dry, some of the cereal tends to fall out. If too wet, the mass is sticky and gummy and tends to adhere to the hands. It preferably is corrected by adding more cereal and meat in substantially equal proportions but with the meat chosen from the organs or portions having higher natural fluid content if the mix is too dry and from organs or portions having lower natural fluid content if the mix is too wet. The fortifying ingredients, if added, preferably are added during mixing or by first mixing with the cereal.

After the mixture is brought to the desired consistency, it is passed through a rotary grinder by which it is ground and extruded into pellets. The grinder used may be any one of the conventional butcher's meat grinders and which comprises generally a hopper in the bottom of which is a worm feed which forces material through a circumferentially extending row of perforations in a plate coaxial with the worm while the inner face of the plate is continually swept by four knife blades which extend radially of the plate beyond the row of holes and are spaced apart uniformly circumferentially of the plate axis from each other.

In ordinary butcher shops, such plates are initially usually about six inches in diameter, $1\frac{1}{4}$ inch thick and provided with a row of $\frac{3}{8}$ inch diameter holes or bores, the cooperating knives extending radially past the holes and being about $12/16$ inch wide circumferentially of the plate. Generally, such plates and knives are unsatisfactory in their initial condition due to the limited space between the blades and resistance to flow through the bores of the plate which combine to cause undue packing of the ingredients with resultant heating and freeing of so much of the juices that the mass becomes doughy. It has been found that used worn plates and blades of such grinders are more satisfactory. For example, plates which have been repeatedly ground or worn to a thickness of $\frac{7}{16}$ of an inch combined with blades which have been resharpened repeatedly and thereby ground to about $\frac{2}{16}$ or less of an inch in circumferentoal extent extrude the mass of ingredients without heating, without breaking down the meat particles to too small a size and without freeing too much of the natural fluids for absorption by the cereal.

The feed issues from the grinder as vermiform pellets of about $\frac{3}{8}$ inch in diameter which break off in lengths of from $\frac{1}{2}$ inch to $1\frac{1}{4}$ inches and pile into a loose pile or heap in which the pellets are crisscrossed or irregularly arranged so that, after compacting of the pile by moderate hand pressure, it is somewhat open and lattice-like and leaves a large surface area exposed to, or accessible to, the air. The pellets normally are frangible but retain their individual shapes and identity as the ingredients of each, though somewhat dry, are sufficiently moist to adhere after being pressed together by the pressure resulting from the extrusion step.

The open though slightly compacted piles of pellets usually are placed in suitable containers and immediately quick frozen or deep frozen at a temperature of about 10 to 20° below zero Fahrenheit, in which condition they are kept until ready for use. The freezing requires a very short time due to the high surface to volume ratio of the pellets and the open lattice-like formation of the pile. When the pile is deep frozen, however, since there is little free moisture present, the pellets are superficially tacked or stuck together by thin films of frost or ice. Thus, without thawing the required amount of them can be separated from the mass.

In case long storage periods are not required, the feed can be chilled easily without freezing because of the high surface to volume ratio and lasts for many days if kept in a reasonably cool place and fed in the form in which it is extruded.

If the pile of frozen pellets is exposed to the normal warm air of a room, the pellets thaw quickly due to the large surface area exposed, so that the required amount can be separated with the fingers and the remainder quickly rechilled or refrozen in the ordinary domestic refrigerator. In fact, the outer pellets of the pile can be separated before the temperature of the inner pellets has risen an undesirable amount. After separating, the pellets may be placed in the feeding tray and quickly reach the proper temperature for eating. Upon thawing, the fresh condition of the pellets is essentially the same as when they were first extruded and they are moist but not wet or soggy.

Thus distinct advantages result not only from the shape of the pellets but from the use of substantially only the natural fluids of the meat as the moisture content. These natural fluids, due to their salinity and other constituents, do not cause the cereal to sour but tend to preserve it unchanged during repeated chilling or freezing and warming or thawing, especially when both refreezing and rethawing can be done so rapidly. Even after thawing, the feed can be exposed to the air at room temperature for considerable intervals without deterioration.

If any water must be added due to a preponderance of only drier portions in the meat available, it should be used very sparingly, for example, not over 10%, by weight, so that it is overshadowed by a preponderance of the natural fluids of the meat.

Various modifications may be made in the proportions of ingredients but a meat to cereal ratio should be maintained, if possible, such that the moisture content is as nearly as possible limited to the natural fluids of the meat and such that there is just sufficient moisture present so that the meat and cereal adhere when compacted at pressures which are above hand pressures but are sufficiently low so as not to crush the meat particles.

Actual feeding experience with the present feed discloses that it is much preferred by foxes and dogs to the prior feeds above described and that such animals do not tire of it but continue to seek it in preference to other foods even after long periods of feeding with it to the exclusion of other foods.

The term "consisting essentially of" as used in the claims is not meant to exclude minor amounts of fortifying ingredients which, while making a difference in the nutritive value of the feed, are insufficient in amount to have any appreciable effect on the new cooperative relations between the meat particles and cereal.

Having thus described our invention, we claim:

1. A feed for carnivorous animals comprising individually compact frangible moist pellets, each consisting essentially of about equal parts of ground fresh meat and dry cereal intimately intermixed and containing as the moisture content substantially only the natural fluids of the fresh meat.

2. A feed according to claim 1 further characterized in that said dry cereal is precooked.

3. A feed according to claim 1 characterized in that said pellets, while retaining their individual identities, are arranged irregularly in a pile so as to provide a multiplicity of distributed passages for air into the interior of the pile.

4. A feed according to claim 3 characterized in that said pellets are bonded to each other in said pile by thin superficial frost films.

5. A feed for carnivorous animals comprising individually compact frangible moist pellets, each consisting essentially of about 45% to 55% ground fresh meat and about 55% to 45% dry cereal, said meat and dry cereal being intimately intermixed and containing as the moisture content substantially only the natural fluids of the fresh meat.

6. A feed according to claim 1 further characterized in that the pellets contain fortifying ingredients in the amount of about 2% by weight of the combined weight of the meat and dry cereal.

7. The method of making a feed for carnivorous animals comprising intimately mixing about equal parts of ground fresh meat and precooked dry cereal and after mixing, extruding the mixture under sufficient pressure to form the mixture into elongated cylindrical pellets, in each of which the meat and cereal are tacked together by substantially only the natural fluids of the meat which have been freed by the extrusion pressure.

WILLIAM H. KELLY, Jr.
JOHN R. KELLY.

REFERENCES CITED

The following references are of record in the file of this patent:

UNITED STATES PATENTS

| Number | Name | Date |
|---|---|---|
| 982,711 | Ellis | Jan. 24, 1911 |
| 2,167,723 | Meakin | Aug. 1, 1939 |

FOREIGN PATENTS

| Number | Country | Date |
|---|---|---|
| 264,278 | Great Britain | of 1926 |
| 405,283 | Great Britain | of 1931 |
| 473,704 | Great Britain | of 1937 |